United States Patent
Tan et al.

(10) Patent No.: US 8,570,357 B2
(45) Date of Patent: Oct. 29, 2013

(54) SYSTEMS AND METHODS FOR REDUCING VIDEO CROSSTALK

(75) Inventors: Kar-Han Tan, Sunnyvale, CA (US); Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 273 days.

(21) Appl. No.: 13/098,277

(22) Filed: Apr. 29, 2011

(65) Prior Publication Data

US 2012/0274732 A1   Nov. 1, 2012

(51) Int. Cl.
*H04N 7/14*   (2006.01)

(52) U.S. Cl.
USPC ...................................... 348/14.08

(58) Field of Classification Search
USPC .................... 348/14.01–14.16, 744
See application file for complete search history.

(56) References Cited

U.S. PATENT DOCUMENTS

| | | | |
|---|---|---|---|
| 6,332,693 B1 | 12/2001 | Dove et al. | |
| 6,456,339 B1 * | 9/2002 | Surati et al. | 348/745 |
| 7,222,973 B2 | 5/2007 | Eguchi | |
| 7,239,293 B2 | 7/2007 | Perlin et al. | |
| 7,468,778 B2 | 12/2008 | Thomas et al. | |
| 7,690,795 B2 * | 4/2010 | Cole et al. | 353/30 |
| 7,905,606 B2 * | 3/2011 | Bullock | 353/69 |
| 2010/0188548 A1 * | 7/2010 | Robinson et al. | 348/333.01 |

OTHER PUBLICATIONS

Flikaya, T. H. et al., "An Effective Interaction Tool for Performance in the Virtual Studio-Invisible Light Projection System".
Grundhofer, Anselm, et al., "VirtualStudio2Go: Digital Video Composition for Real Environments".

\* cited by examiner

*Primary Examiner* — Curtis Kuntz
*Assistant Examiner* — Sunita Joshi

(57) ABSTRACT

Methods and systems that reduce video crosstalk in video streams sent between participants in a video conference are disclosed. In one aspect, a method for reducing video crosstalk in a video stream sent from a local site to a remote site includes projecting a video stream of the remote site onto a screen at the local site. Each image in the video stream is dimmed according to a dimming factor of a dimming sequence. Crosstalk images of the local site are captured through the screen. Each crosstalk image is a blending of the image of the local site captured through the screen with a dimmed image of the remote site projected onto the screen. Images of the local site with reduced crosstalk are computed based on the dimming sequence. A video stream composed of the images of the local site with reduced crosstalk are sent to the remote site.

20 Claims, 8 Drawing Sheets

SYSTEMS AND METHODS FOR REDUCING VIDEO CROSSTALK

TECHNICAL FIELD

This disclosure relates to video conferencing, and in particular, to removing video crosstalk from video streams sent between video conferencing participants.

BACKGROUND

Video conferencing enables participants located at different sites to simultaneously interact via two-way video and audio transmissions. A video conference can be as simple as a conversation between two participants located at different sites or involve discussions between many participants located at different sites and may include shared content such as a video presentation or slides. As high-speed network connectivity has become more widely available at lower cost and the cost of video capture and display technologies continues to decrease, video conferencing conducted over networks between participants in faraway places is becoming increasing popular.

Video conferencing systems are designed to provide natural interactions between the participants. Desired attributes of these systems include a natural frontal view with correct eye contact and eye gaze and the ability to interact on a shared surface, such as a screen. The video stream of each participant is sent to the other participants so that each participant can view and interact with the images of the other participants. Consider for example a video conference between two participants referred to as a local participant and a remote participant. From the point of view of the local participant, a video conferencing system projects the video stream of the remote participant onto the local participant's screen. A camera located behind the screen captures images of the local participant through the screen while the local participant views the remote participant projected onto the screen. However, the images of the local participant can be corrupted by video crosstalk, which arises when the camera captures not only the images of the local participant through the screen but also the images of the remote participant. As a result, the video stream of the local participant displayed on the remote participant's screen is a combination of the images of the local participant and the remote participant's images projected onto the screen of the local participant. Designers and users of video conference technologies continue to seek improvements to the video-conferencing experience.

DETAILED DESCRIPTION

The disclosure is directed to methods and systems that greatly reduce video crosstalk in video streams sent between participants in a video conference. The methods are predicated on projecting a video stream of a remote participant onto the screen of a local participant with the intensity of each image of the remote participant's video stream brightened and dimmed according to a predetermined dimming sequence. Because each image of the local participant is captured through the screen, each image of the local participant's video stream is corrupted by video crosstalk with a projected image of the remote participant's video stream. With knowledge of the dimming sequence, methods and systems described below essentially remove video crosstalk from the video stream of the local participant sent to the remote participant.

Figure 1:
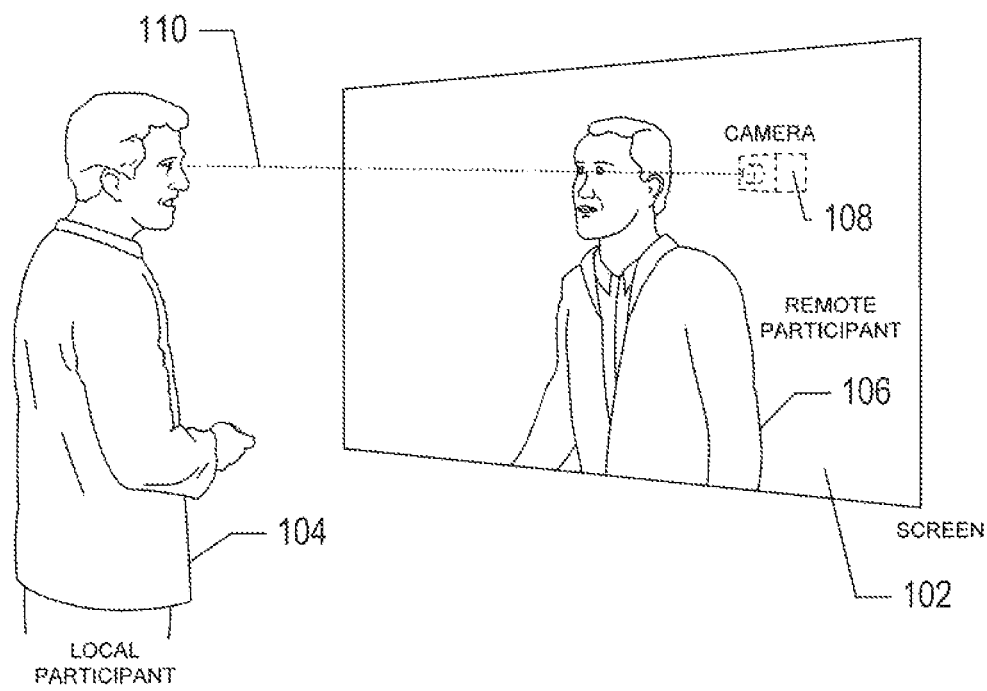
FIG. 1 shows an example of two video-conferencing participants interacting through a screen.

FIG. 1 shows an example of two video-conferencing participants interacting through a screen 102. The screen 102 enables a local participant 104 to interact with a remotely located participant 106. The remote participant 106 can be presented on the screen 102 to appear substantially life size to the local participant 104. A camera 108 is positioned behind the screen 102 at approximately eye level to the local participant 104, to capture images of the local participant 104 through the screen 102. The camera 108 can be positioned so that its viewpoint is roughly equivalent to that of the remote participant 106. In order to capture gestures made by the local participant 104, the camera 108 can also be positioned so that the camera's field of view encompasses approximately the entire screen 102. Images of the participants 104 and 106 are captured at their respective sites and processed so that perceived eye contact and accurate gaze awareness is created between the participants. For example, as shown in FIG. 1, the image of the remote participant 106 is projected onto the screen 102 so that when the local participant 104 looks at the remote participant's face, local participant 102 looks along a line of sight represented by dashed line 110 that passes approximately between the eyes of the remote participant's image and into the lens of the camera 108. As a result, the local participant 104 perceives eye contact with the remote participant 106, and by looking into the lens of the camera 108, that same experience can be recreated at the remote participant's site.

Figure 2:
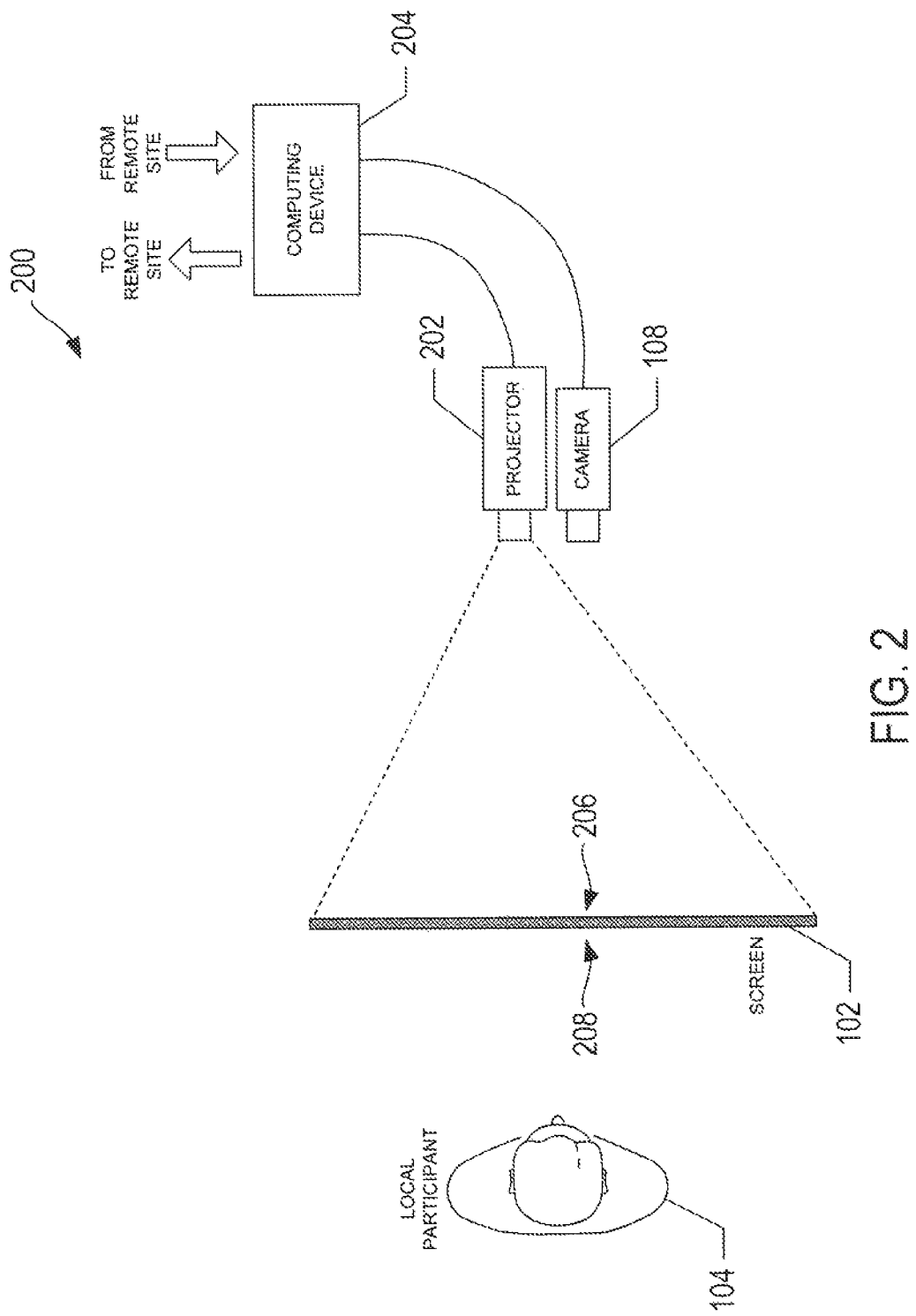
FIG. 2 shows a top-plan view and schematic representation of an example visual-collaborative system.

FIG. 2 shows a top-plan view and schematic representation of an example visual-collaborative system 200. The system 200 includes the screen 102, the camera 108, a projector 202, and a computing device 204. The camera 108 and projector 202 are connected to the computing device 204, and the camera 108 and projector 202 are positioned to face the rear surface 206 of the screen 102. The screen 102 can be composed of a relatively low concentration of light diffusing particles that diffuse light striking the rear surface 206 within a range of angles. The projector 202 is positioned to project images onto the rear surface 206 within this range of angles so that when the local participant 102 views the front surface 208 of the screen 102 the local participant 102 sees the projected images. The screen 102 also transmits light scattered from objects that face the front surface 210. In other words, the camera 108 is positioned to face the rear surface 206 so that light scattered off of objects that face the front surface 208 pass through the screen 102 and are captured as images by the camera 108.

Figure 3:
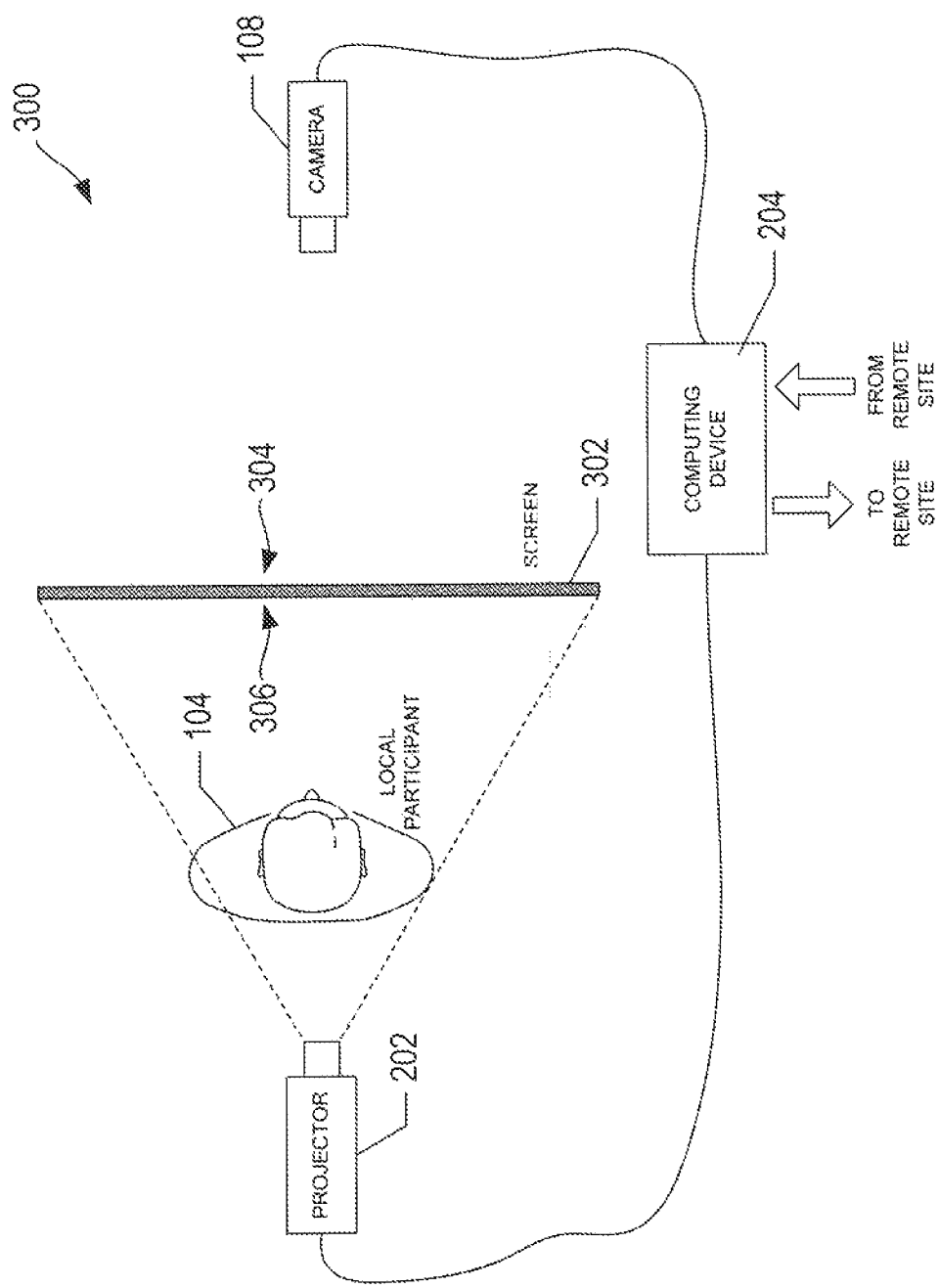
FIG. 3 shows a top-plan view and schematic representation of an example visual-collaborative system.

FIG. 3 shows a top-plan view and schematic representation of an example visual-collaborative system 300. The system 300 is similar to the system 200 with many of the same components including the camera 108, projector 202, and the computing device 204, but the rear projection screen 102 of the system 200 is replaced by a front projection screen 302 and the projector 202 is repositioned to project images onto the front surface 306 of the screen 302. The camera 108 faces the rear surface 304 of the screen 302 and captures images through the screen 302.

In order to prevent ambient light in the local participant's room from striking the rear surfaces 206 and 304 of the screens 102 and 302, respectively, and interfering with the images captured by the camera 108, the systems 200 and 300 can include housings (not shown). For example, a housing associated with the system 200 encloses the camera 108, projector 202, and the screen 102 is located within an opening of the housing to only allow light to enter and exit the housing through the screen 102.

Methods for reducing crosstalk in images captured by the camera 108 are now described with reference to the videoconferencing system 200. The camera 108 and projector 202 are timed so that images of scenes are captured through the screen 102 at approximately the same time images are projected onto the screen 102. The camera 108 captures a series of images that form a video stream sent to the computing device 204 for video processing. Without video crosstalk reduction, each image captured by the camera 108 appears as a blending of the image of the local participant 104 captured through the screen 102 with the image of the remote participant 106 projected onto the screen 102.

Figure 4:
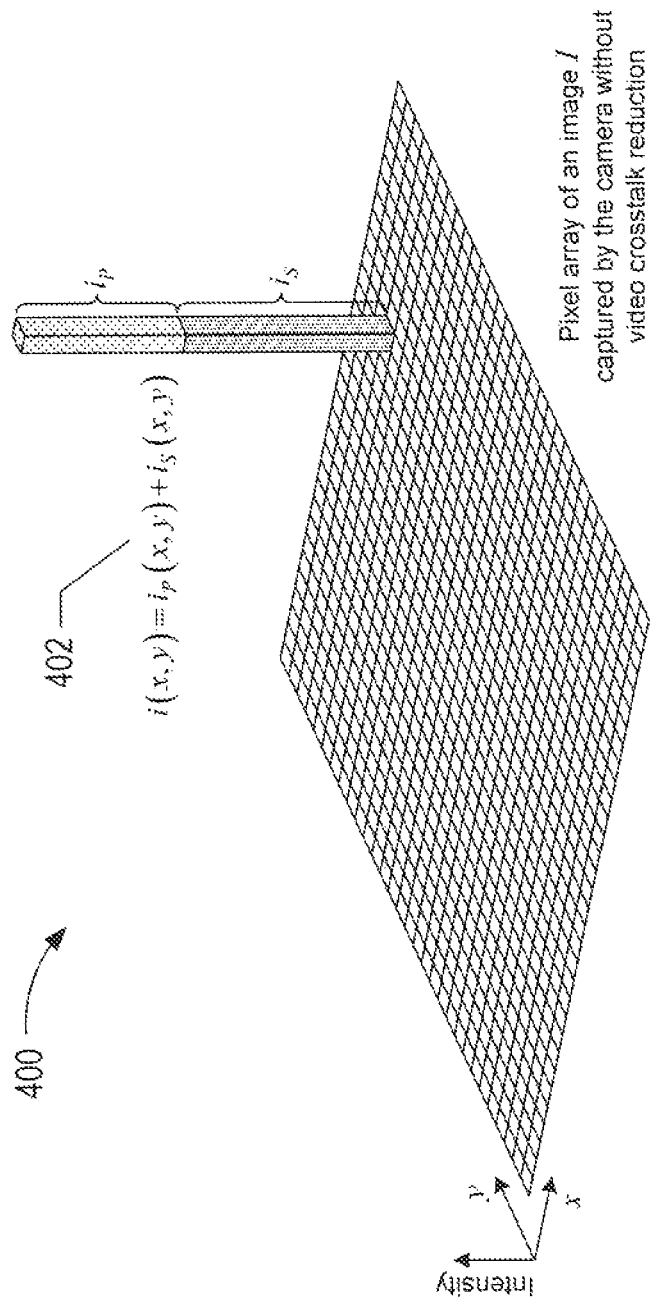
FIG. 4 shows an example plot of an array of pixels associated with a single image captured by a camera of a video-conferencing system without adjusting for video crosstalk.

FIG. 4 shows an example plot of an array of pixels 400 associated with a single image captured by the camera 108 without adjusting for video crosstalk. Each pixel has an (x,y) coordinate and an associated intensity i. For the sake of simplicity of illustration and discussion, only one pixel i(x,y) 402 in the array of pixels is represented. The pixel 402 can be a single color pixel, such as red, green, or blue, of a full color image. Without adjusting for video crosstalk, the projector 202 projects each image onto the screen with approximately 100% intensity. As a result, the intensity of each pixel in the image I is corrupted by video crosstalk. For example, the pixel i(x,y) 402 is the sum of an intensity $i_S$ associated with a scene captured through the screen 102 and an intensity $i_p$ associated with an image projected onto the screen 102.

Each corrupted image of a video stream is sent from the camera 108 to the computing device 204 for video processing to substantially reduce the intensity contribution of the projected images so that each image in the video stream sent from the computing device 204 to the remote participant 106 is essentially composed of the scene captured through the screen 102 with the contribution of the image projected onto the screen 102 significantly reduced. In order to reduce the contribution of each projected image to the image of the scene captured by the camera 108, the intensity of each image projected onto the screen 102 is adjusted according to a dimming sequence. In the example described below, the dimming sequence is composed of two dimming factors $K_1$ and $K_2$ applied to images projected successively onto the screen 102. In certain embodiments, the two images to be projected on the screen may be a pair of identical images where $K_1$ is applied to one of the images and $K_2$ is applied to the other image. For each pair of successive images, the intensity of the first image of a pair of images to be projected onto the screen 102 is adjusted by the dimming factor $K_1$ and the second image of the pair of images is adjusted by the dimming factor $K_2$, where $0<K_1\leq 1$, $0<K_2\leq 1$, and $K_1 \neq K_2$.

Figure 5:
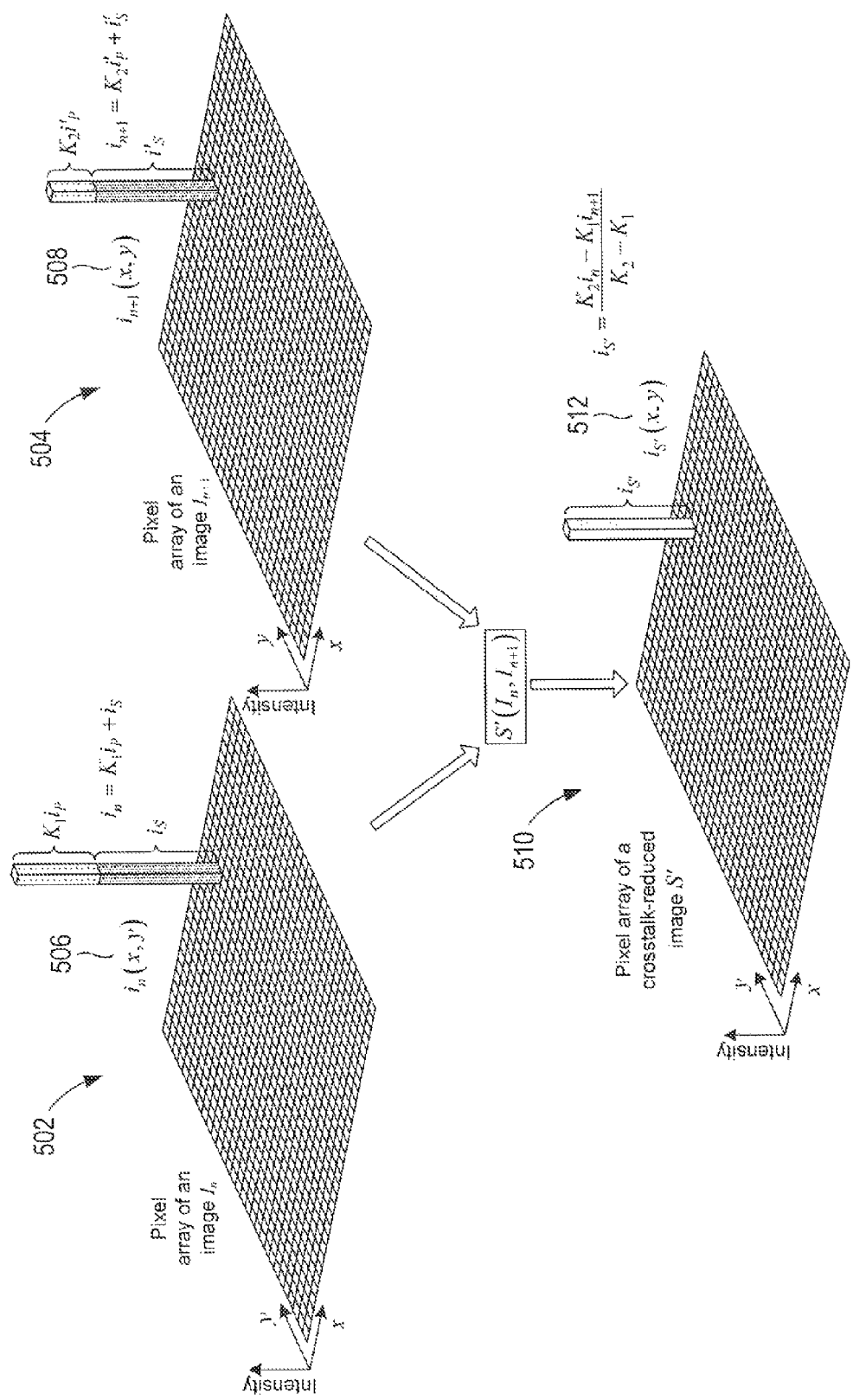
FIG. 5 shows an example of a crosstalk-reduced image generated from two successive images adjusted according to a dimming sequence.

FIG. 5 shows an example of a crosstalk-reduced image S' generated from two successive images adjusted according to the dimming sequence. In the example of FIG. 5, two successive images $I_n$ and $I_{n+1}$ captured by the camera 108 are represented by pixel arrays 502 and 504, respectively, where the index n is an integer representing time samples. The image $I_n$ is captured when the intensity of the image projected onto the screen 102 is adjusted by the scale factor $K_1$, and the image $I_{n+1}$ is subsequently captured when the intensity of the image projected onto the screen 102 is adjusted by the scale factor $K_2$. As a result, the intensity of the pixels in each of the pixel arrays 502 and 504 are similarly adjusted. For example, for the sake of simplicity of illustration and discussion, only the pixel $i_n(x,y)$ 506 of the pixel array 502 is represented and only the pixel $i_{n+1}(x,y)$ 508 of the subsequent pixel array 504 is represented. The pixels 506 and 508 have the same coordinates (x,y). The intensity $i_n$ of the pixel 506 is the sum of intensity $i_S$ associated with the scene captured through the screen 102 and the adjusted intensity $K_1 i_p$ associated with the image projected onto the screen 102. The intensity $I_{n+1}$ of the pixel 508 is the sum of intensity $i'_S$ associated with the scene captured through the screen 102 and the adjusted intensity $K_2 i'_p$ associated with the image projected onto the screen 102.

Although the images $I_n$ and $I_{n+1}$ include video crosstalk, the amount of video crosstalk associated with the images projected onto the screen is known based on the dimming sequence. Knowledge of the amount of video crosstalk in each pair of consecutive images can be used to generate the reduced crosstalk image S'. The reduced crosstalk image S' associated with images $I_n$ and $I_{n+1}$ is represented by pixel array 508. The intensity of each pixel, such as pixel 510, is determined by $$i_{S'}(x,y) = \frac{K_2 i_n(x,y) - K_1 i_{n+1}(x,y)}{K_2 - K_1} \qquad (1)$$

where $i_{S'}$ represents the reduced crosstalk intensity of the pixel. Equation (1) is applied to each pair of pixels with the same (x,y) coordinates in the images $I_n$ and $I_{n+1}$ to produce the reduced crosstalk image S'. In general, the reduced crosstalk image S' based on the pair of successive images $I_n$ and $I_{n+1}$ can also be represented by:

$$S' = \frac{K_2 I_n - K_1 I_{n+1}}{K_2 - K_1} \qquad (2)$$

Figure 6:
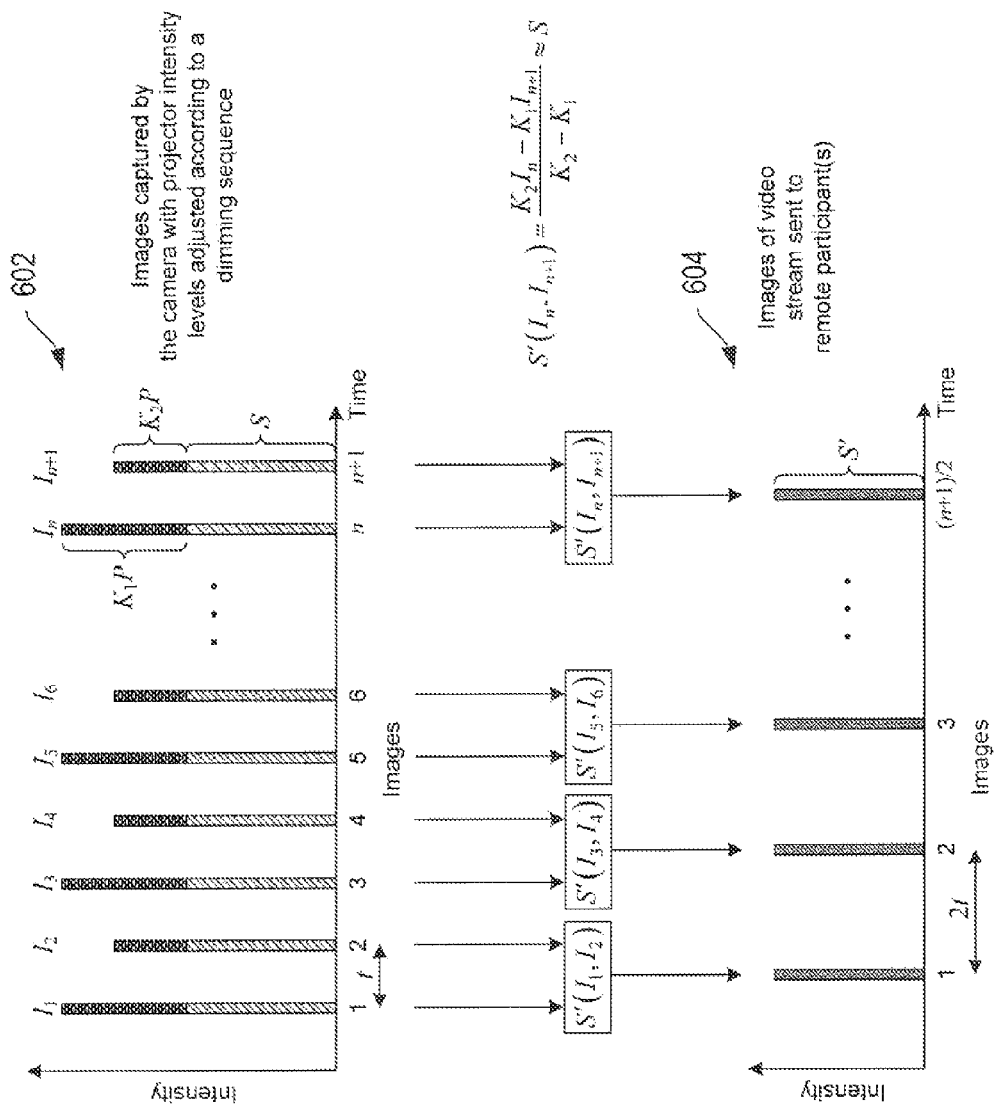
FIG. 6 shows how a pair of successive images processed to produce a reduced crosstalk video stream.

The successive images $I_n$ and $I_{n+1}$ captured by the camera 108 are sent to the computing device 204 to be processed into a single, essentially crosstalk free, video stream. FIG. 6 shows how each pair of successive images is processed according to Equation (2) to produce a reduced crosstalk video stream. As described above, each image captured by the camera 108 is corrupted by an image that is simultaneously projected onto the screen 102, but the portion of the image intensity associated with the image projected onto the screen 102 is known and appears as a pattern in each successive pair of images. For example, the successive images $I_n$ and $I_{n+1}$ captured by the camera 108 are presented in plot 602 where P represents the projected image at approximately 100% intensity as captured by the camera 108 and S represents the scene captured through the screen 102 by the camera 108 without the image projected by the projector 202. Each pair of successive images is processed according to Equation (2) to produce a reduced crosstalk image S' of the scene captured through the screen 102. The crosstalk-reduced images S' are spaced in time by approximately 2t, where t is the time between successive images captured by the camera 108. The reduced crosstalk images shown in plot 604 form the video stream sent from the computing device 204 to the remote participant.

Methods are not limited to using equations (1) and (2) described above to generate reduced crosstalk images in video stream. In general, a least-squares approach using multiple input frames can also be used to reconstruct a video stream with reduced crosstalk. Methods also include applying more than one dimming factor to the same repeated image of a video stream.

Figure 7:
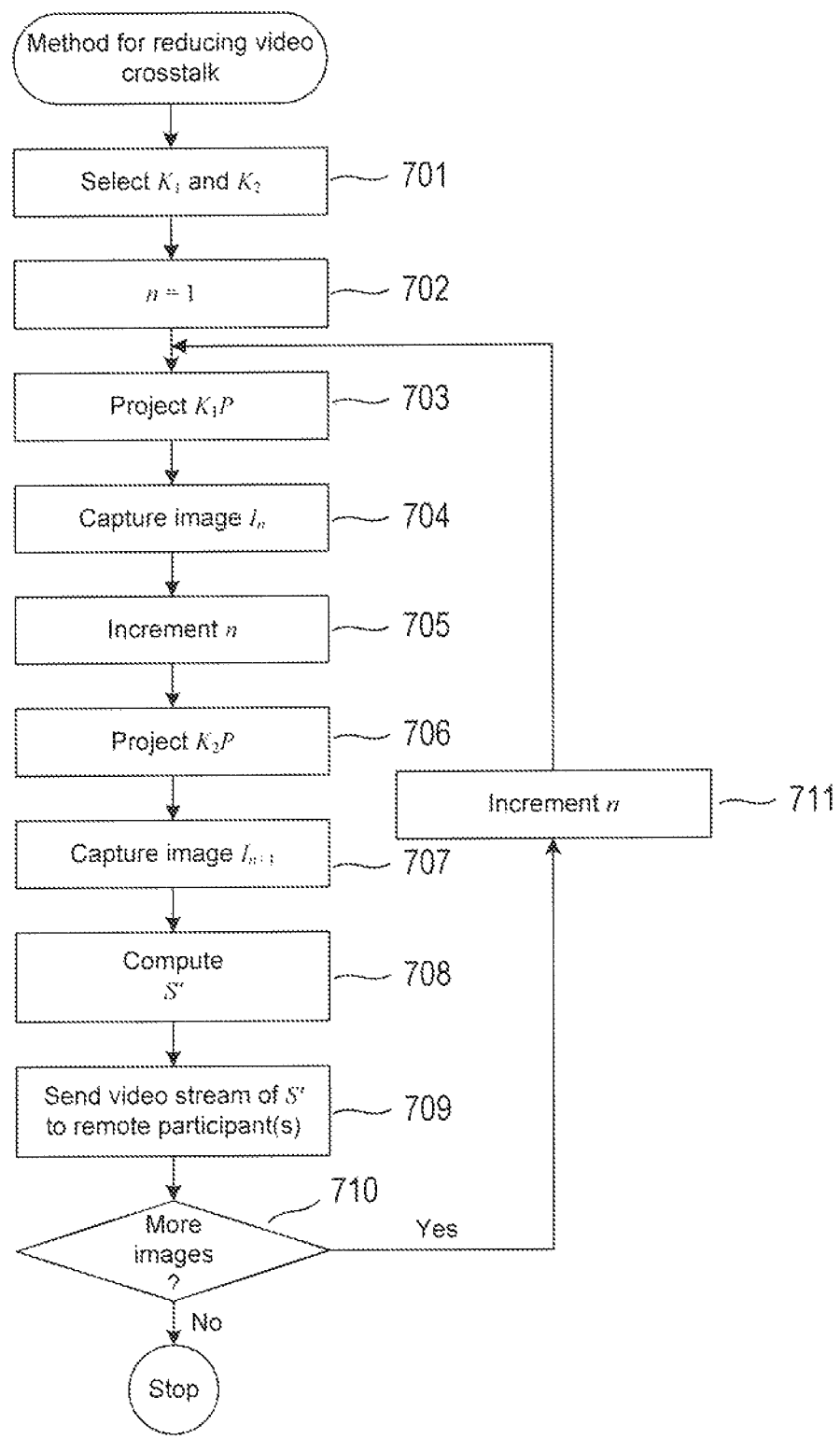
FIG. 7 shows a control-flow diagram of an example method for reducing video crosstalk.

FIG. 7 shows a control-flow diagram 700 of an example method for reducing video crosstalk. In block 701, the dimming sequence parameters are selected. For example, the dimming sequence can be based on two parameters $K_1$ and $K_2$ as described above. In block 702, the image index n is initialized to "1." In block 703, an image is projected on the screen of a video-conferencing system with an intensity $K_1P$, where P represents the projected image at approximately 100% intensity as captured by the camera of the video-conferencing system. In block 704, an image $I_n$ of the scene observed through the screen and the image with intensity $K_1P$ are captured by the camera of the video-conferencing system, as described above with reference to FIG. 6. In block 705, the image index 17 is incremented. In block 706, another image is projected on the screen of a video-conferencing system with an intensity $K_2P$. In block 707, an image $I_{n+1}$ of the scene observed through the screen and the image with intensity $K_2P$ are captured by the camera of the video-conferencing system, as described above with reference to FIG. 6. In block 708, a reduce crosstalk image S' is computed as described above with reference to Equations (1) and (2). In block 709, the reduced crosstalk images S' are sent in the form of a video stream to the remote participant for viewing, as described above with reference to FIG. 7. In block 710, when more reduced crosstalk images are to be determined, the index n is incremented in block 711 and the operations of blocks 703-708 are repeated. Otherwise, the method stops.

Figure 8:
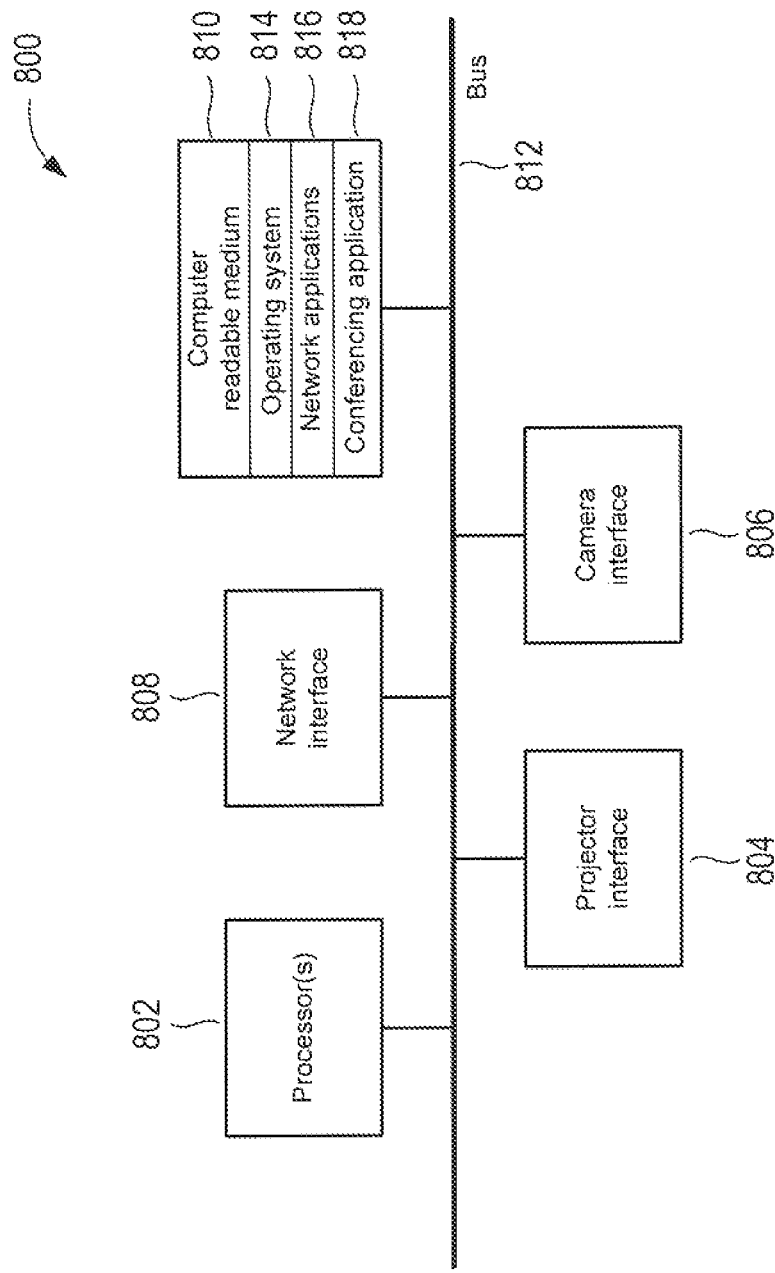
FIG. 8 shows a schematic representation of a computing device.

The computing device 204 can be a desktop computer, a laptop, or any other suitable device configured to carry out video and image processing. In certain embodiments, the computing device 204 can be integrated in the projector 202 or the camera 108. FIG. 8 shows a schematic representation of a computing device 800. The device 800 may include one or more processors 802; a projector interface 804; a video or camera interface 806; one or more network interfaces 808, such as a Local Area Network LAN, a wireless 802.11x LAN, a 3G mobile WAN or a WiMax WAN; and one or more computer-readable mediums 810. Each of these components is operatively coupled to one or more buses 812. For example, the bus 812 can be an EISA, a PCI, a USB, a FireWire, a NuBus, or a PDS.

The computer-readable medium 810 can be any suitable medium that participates in providing instructions to the processor 802 for execution. For example, the computer-readable medium 810 can be non-volatile media, such as an optical disk, a magnetic disk, or a magnetic disk drive; and volatile media, such as memory. The computer-readable medium 810 can also store computer-readable instructions, including word processors, browsers, email, Instant Messaging, media players, and telephony software.

The computer-readable medium 810 may also store an operating system 814, such as Mac OS, MS Windows, Unix, or Linux; network applications 816; and a video-conferencing application 818. The operating system 814 can be multi-user, multiprocessing, multitasking, multithreading, and real-time. The operating system 814 can also perform basic tasks such as recognizing input from input devices, such as a keyboard, a keypad, or a mouse; sending output to a projector and a camera; keeping track of files and directories on medium 810; controlling peripheral devices, such as disk drives, printers, image capture device; and managing traffic on the one or more buses 812. The network applications 816 includes various components for establishing and maintaining network connections, such as computer-readable instructions for implementing communication protocols including TCP/IP, HTTP, Ethernet, USB, and FireWire.

The video-conference application 818 provides various computer-readable instruction components for sharing content between video conference participants, as described above. In certain embodiments, some or all of the processes performed by the application 818 can be integrated into the operating system 814. In certain embodiments, the processes can be at least partially implemented in digital electronic circuitry, or in computer hardware, or in any combination thereof.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. A method for reducing video crosstalk in a video stream sent from a local site to a remote site, the method comprising:
    projecting a video stream of images of the remote site onto a screen at the local site, wherein the projecting comprises dimming sequential ones of the images in the video stream in accordance with a predetermined dimming sequence of at least one dimming factor;
    capturing crosstalk images of the local site through the screen using a camera, each crosstalk image is an image of illumination from the local site captured through the screen and illumination from a respective one of the projected images of the remote site;
    computing images of the local site with reduced crosstalk based on the dimming sequence using a computing device; and
    sending a video stream composed of the images of the local site with reduced crosstalk to the remote site.

2. The method of claim 1, wherein projecting a video stream of the remote site onto a screen at the local site further comprises each image in the video stream to be projected at least two times successively, and wherein each of the at least two images are identical and dimmed in accordance with a different dimming factor of the dimming sequence.

3. The method of claim 1, wherein each of the at least two images dimmed in accordance with the different dimming factor of a dimming sequence further comprises adjusting the intensity of each pixel of an image according to the dimming factor.

4. The method of claim 1, wherein sending the video stream to the remote site further comprises sending the images of the local site with reduced crosstalk separated in time by nt, where n is the number of dimming factors in the dimming sequence and t is the time difference between captured crosstalk images.

5. The method of claim 1, wherein projecting the video stream and capturing the crosstalk images further comprising projecting each image at approximately the same time each crosstalk image is to be captured.

6. The method of claim 1, wherein computing the images of the local site with reduced crosstalk further comprises computing $$S' = \frac{K_2 I_n - K_1 I_{n+1}}{K_2 - K_1}$$

where S' represents an image of the local site with reduced crosstalk, $I_n$ and $I_{n+1}$ represent a pair of successive images captured by the camera, and $K_1$ and $K_2$ are dimming factors with $0<K_1$, $0<K_2$, and $K_1 \neq K_2$.

7. The method of claim 1, wherein computing the images of the local site with reduced crosstalk further comprises computing the images of the local site with reduced crosstalk using least-squares for multiple crosstalk images.

8. The method of claim 1, wherein the video stream of the remote site further comprises a series of images sent from the remote site.

9. The method of claim 1, wherein the screen further comprises a rear projection screen with the projector to project the series of images of the remote site onto the rear surface of the screen and the camera faces the rear surface of the screen.

10. The method of claim 1, wherein the screen further comprises a front projection screen with the projector to project the series of images of the remote site onto the front surface of the screen and the camera faces the rear surface of the screen.

11. A non-transitory computer-readable medium having instructions encoded thereon for reducing video crosstalk in a video stream sent from a local site to a remote site, the instructions enabling one or more processors to perform the operations of:
   projecting a video stream of images of the remote site onto a screen at the local site, wherein the projecting comprises dimming sequential ones of the images in the video stream in accordance with a predetermined dimming sequence of at least one dimming factor;
   capturing crosstalk images of the local site through the screen using a camera, each crosstalk image is an image of illumination from the local site captured through the screen and illumination from a respective one of the projected images of the remote site;
   computing images of the local site with reduced crosstalk based on the dimming sequence; and
   sending a video stream composed of the images of the local site with reduced crosstalk to the remote site over a network.

12. The non-transitory computer-readable method of claim 11, wherein projecting the video stream of the remote site onto a screen at the local site further comprises each image in the video stream to be projected at least two times successively, and wherein each of the at least two images are identical and dimmed in accordance with a different dimming factor of the dimming sequence.

13. The non-transitory computer-readable medium of claim 11, wherein each of the at least two images dimmed in accordance with the different dimming factor of a dimming sequence further comprises adjusting the intensity of each pixel of an image according to the dimming factor.

14. The non-transitory computer-readable medium of claim 11, wherein sending the video stream to the remote site further comprises sending the images of the local site with reduced crosstalk separated in time by nt, where n is the number of dimming factors in the dimming sequence and t is the time difference between captured crosstalk images.

15. The non-transitory computer-readable medium of claim 11, wherein projecting the video stream and capturing the crosstalk image pairs further comprising projecting each image of the video stream at approximately the same time each crosstalk image is to be captured.

16. The non-transitory computer-readable medium of claim 11, wherein computing the images of the local site with reduced crosstalk further comprises computing $$S' = \frac{K_2 I_n - K_1 I_{n+1}}{K_2 - K_1}$$

where S' represents an image of the local site with reduced crosstalk, $I_n$ and $I_{n+1}$ represent a pair of successive images in an image pair captured by the camera, and $K_1$ and $K_2$ are dimming factors with $0<K_1$, $0<K_2$, and $K_1 \neq K_2$.

17. The non-transitory computer-readable medium of claim 11, wherein computing the images of the local site with reduced crosstalk further comprises computing the images of the local site with reduced crosstalk using least-squares for multiple crosstalk images.

18. The non-transitory computer-readable medium of claim 11, wherein the video stream of the remote site further comprises a series of images sent from the remote site.

19. The non-transitory computer-readable medium of claim 11, wherein the screen further comprises a rear projection screen with the projector to project the series of images of the remote site onto the rear surface of the screen and the camera faces the rear surface of the screen.

20. The non-transitory computer-readable medium of claim 11, wherein the screen further comprises a front projection screen with the projector to project the series of images of the remote site onto the front surface of the screen and the camera faces the rear surface of the screen.

* * * * *

UNITED STATES PATENT AND TRADEMARK OFFICE
CERTIFICATE OF CORRECTION

PATENT NO. : 8,570,357 B2  
APPLICATION NO. : 13/098277  
DATED : October 29, 2013  
INVENTOR(S) : Kar-Han Tan et al.

Page 1 of 1

It is certified that error appears in the above-identified patent and that said Letters Patent is hereby corrected as shown below:

In the Claims:

In column 8, line 4, in Claim 12, delete "method" and insert -- medium --, therefor.

Signed and Sealed this
Twentieth Day of May, 2014

Michelle K. Lee
*Deputy Director of the United States Patent and Trademark Office*